United States Patent [19]

Vander Molen et al.

[11] Patent Number: 4,923,254

[45] Date of Patent: May 8, 1990

[54] HYDRAULIC PARKING BRAKE CONTROL SYSTEM

[75] Inventors: Gary L. Vander Molen, North Ridgeville; Duane R. Johnson, Wellington, both of Ohio

[73] Assignee: Allied-Signal Inc., Morristown, N.J.

[21] Appl. No.: 313,788

[22] Filed: Feb. 23, 1989

[51] Int. Cl.[5] .................. B60T 15/16; B60T 13/18; B60T 13/22

[52] U.S. Cl. ........................ 303/13; 303/10; 303/54; 303/71

[58] Field of Search .............. 303/2, 9, 10, 13, 50, 303/54, 56, 59, 71; 188/152, 170

[56] References Cited

U.S. PATENT DOCUMENTS

| | | | |
|---|---|---|---|
| 3,617,097 | 11/1971 | Grabb | 303/13 |
| 3,768,871 | 10/1973 | Meyers | 303/9 |
| 3,858,944 | 1/1975 | Pocobello et al. | 303/2 |
| 4,223,953 | 9/1980 | Cruse | 303/13 |
| 4,456,311 | 6/1984 | Houtz | 303/71 |

*Primary Examiner*—Andres Kashnikow
*Assistant Examiner*—Timothy Newholm
*Attorney, Agent, or Firm*—Ken C. Decker; William N. Antonis

[57] ABSTRACT

A hydraulic control valve for controlling the parking brakes of a vehicle hydraulic braking system having mechanically applied parking brakes which are released by hydraulic pressure includes a housing having a mechanically actuated control valve and a diverter assembly. When the vehicle is parked, the parking brakes are vented to reservoir and fluid from the vehicle hydraulic pump is communicated directly from the inlet of the valve to the return or drain port of the valve. When the brakes are released, communication between the spring brakes and reservoir pressure is cut off, and fluid communicated into the inlet is diverted to the diverter assembly, which builds pressure to a predetermined level which is communicated to the vehicle parking brakes to release the latter. When the predetermined pressure level is attained, the diverter assembly automatically opens to permit fluid to bypass the diverter assembly back to the return or drain port.

16 Claims, 1 Drawing Sheet

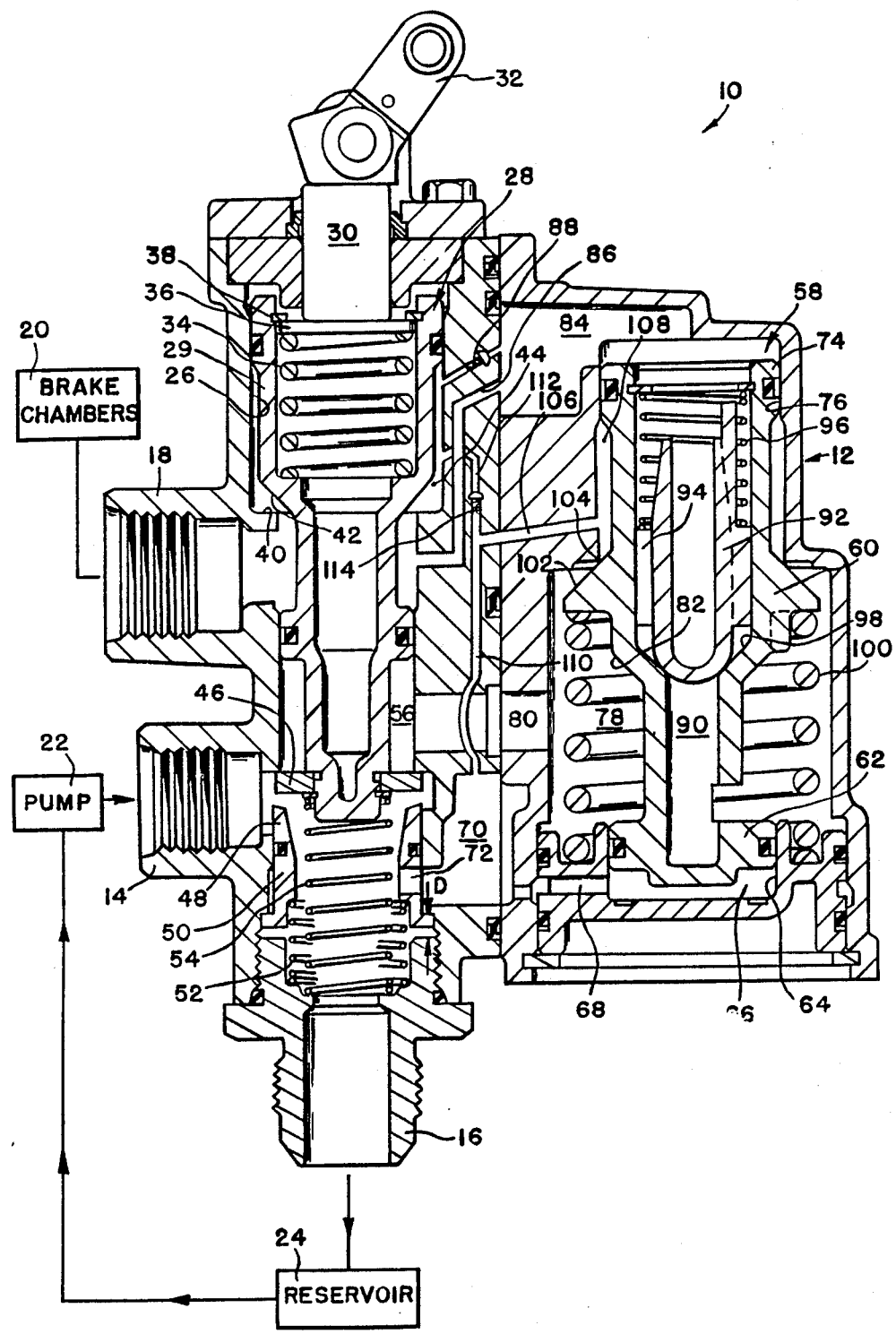

HYDRAULIC PARKING BRAKE CONTROL SYSTEM

This invention relates to a hydraulic control valve for controlling the parking brakes of a vehicle hydraulic braking system having mechanically applied parking brakes which are released by fluid pressure.

Many medium duty trucks, buses, motorhomes, etc. are equipped with hydraulic braking systems, but are too large to be parked by using the manually applied parking mechanism used on smaller vehicles, such as passenger cars. Accordingly, it has become common to equip such vehicles with parking actuators which are mechanically applied by a relatively large spring. When the brake is to be released so the vehicle can be moved, hydraulic fluid under pressure opposes the spring, thereby releasing the brake. The present invention relates to a valve for controlling the system. A prior art system and valve are disclosed in U.S. Pat. No. 4,072,360.

Such prior art systems use a valve in which an operator actuated control valve is located on the vehicle dash, and the main system control valve is located on a different part of the vehicle. The system control valve includes a valve member which is actuated by hydraulic pressure supplied from the operator actuated control valve. Accordingly, the valves taken together require nine or more separate hydraulic connections. The valve according to the present invention is directly actuated by the vehicle operator to eliminate all but three of these connections, to thereby provide better performance, and better reliability.

This and other advantages of the present invention will become apparent from the following specification, with reference to the accompanying drawing, the sole figure of which is a cross-sectional view of a hydraulic control valve made pursuant to the teachings of the present invention.

Referring now to the drawing, the hydraulic control valve generally indicated by the numeral 10 includes a housing 12 having an inlet or supply port 14, a return or drain port 16, and a delivery port 18. The delivery port 18 is communicated with the vehicle spring apply hydraulic release parking brake Chambers generally indicated by the numeral 20. Parking brake chambers 20 are conventional, and, since they form no part of the present invention, will not be disclosed in detail. Inlet port 14 is connected to the outlet of a conventional hydraulic pump 22, the inlet of which is connected to a reservoir 24. The return or drain port 16 is communicated to the inlet of the reservoir 24.

Housing 12 defines a bore 26 therewithin which slidably receives an elongated spool valve assembly 28. Spool valve assembly 28 includes a spool 29 and a portion 30 which extends through the end of bore 26 and which engages a mechanical actuator 32. Portion 30 is connected to spool 29 through a lost motion spring loaded connection comprising a spring 34 which urges circumferentially extending member 36 against stop ring 38. The mechanical actuator 32 may be connected to a standard push-pull knob on the vehicle dashboard, or may be connected to the vehicle automatic transmission lever so that the spool valve assembly 28 is automatically actuated when the vehicle operator moves the automatic transmission into the "parked" condition. The mechanical actuator 32 may also be connected to a solenoid actuator.

A first set of circumferentially extending, cooperating valve elements 40, 42 are defined on the wall of the bore 26 and on the spool 29 respectively. The valve elements 40, 42 cooperate to control communication between the delivery port 18 and a circumferentially extending chamber 44 defined between the spool 29 and the wall of the bore 26. A second set of cooperating valve elements 46, 48 are defined respectively on the spool 29 and on an annular member 50 which is slidably mounted within the bore 26. The annular member 50 is urged into the position illustrated in the drawing by a spring 52. It will be noted that a limited degree of sliding movement, indicated by the distance D, is allowed the annular member 50. A spring 54 urges the spool valve assembly 28 into the position illustrated in the drawing. The limited degree of axial movement permitted the annular member 50 permits the valve seat 46 to sealing engage the valve seat 48, while simultaneously permitting the valve members 40, 42 to engage one another. The valve elements 46, 48 control communication between the inlet port 14 and an annular chamber 56 defined between the spool 29 and the wall of the bore 26 and between the inlet port 14 and the return or drain port 16.

Valve 10 further includes a diverter assembly generally indicated by the numeral 58. Diverter assembly 58 includes a differential area piston assembly 60. One end 62 of piston 60 is slidably received in bore 64 defined within the housing 12 and cooperates with the end thereof to define a chamber 66 which is vented to the return or drain port 16 through passage 68, drain chamber 70, and an opening 72 in the annular member 50. The opposite end 74 of piston 60 is slidably received in bore 76 defined within the housing 12. Fluid pressure communicated into annular chamber 78 through a diverter passage 80 from annular chamber 56 acts on projecting portion 82 of the piston 60 to oppose the force exerted on end 74 by fluid pressure in chamber 84 defined between the end 74 of the piston 60 and the corresponding end of the housing 12. Fluid pressure in chamber 84 communicates with the delivery port 18 through delivery passage 86. A relief valve 88 communicates chamber 84 with annular chamber 44 when the pressure level in chamber 84 (and therefore at delivery port 18) exceeds a predetermined pressure level.

Fluid communicates into the chamber 84 from chamber 78 through a passage 90 defined within the piston 60. An inlet check valve 92 carried by the piston 60 permits communication from chamber 78 into chamber 84, but prevents communication the reverse direction. When check valve 92 is open, fluid communicates through passages defined between circumferentially spaced splines 94 on the check valve 92. A spring 96 yieldably urges check valve 92 into sealing engagement with the valve seat 98 defined on the passage 90.

A spring 100 yieldably urges the piston 60 upwardly viewing the Figure, thereby yieldably urging valve member 102 on the piston 60 into engagement with valve member 104 on the housing 12. As will be described hereinafter, equal pressures acting in the chamber 78 and 84, due to the differential in the effective areas of the piston 60 exposed to these pressures, will create a force differential across the piston 60 sufficient to overcome the spring 100 at a predetermined pressure level, thereby opening the valve members 102, 104. A diverter bypass passage 106 communicates with annular chamber 108 with a drain passage 110, which communicates with drain chamber 70 which, as discussed hereinabove, communicates with drain return port 16 through the opening 72. Drain passage 110 includes a branch 112 which communicates with annular chamber 44. A check valve 114 is provided in the branch 112 to prevent fluid from diverter bypass passage 106 from communicating into the annular chamber 44, but permitting fluid pressure in annular chamber 44 to drain into the drain chamber 70.

In operation, the valve 10 as illustrated in the Figure with the components thereof in the positions which they assume in which the vehicle is parked. In this condition, parking brake chambers 20 are vented through delivery port 18 to return port 16 through the drain passage 110 and drain cavity 70. Since the pressure level at delivery port 18 is then at substantially the atmospheric pressure of the reservoir, the spring parking brake actuator effects a mechanical applied parking brake application. Although pump 22 is running at all times that the vehicle engine is running, fluid communicated into inlet port 14 is communicated directly to the drain or return port 16, and therefore back to the reservoir 24. Communication between the inlet port 14 and annular chamber 56 is shut off.

When the vehicle is to be moved, mechanical actuator 32 is operated to force the spool valve assembly 28 downwardly viewing the Figure, to bring the valve elements 40, 42 into engagement with one another, thereby cutting off communication between the parking brake chambers 20 and the drain passage 110. At the same time, valve element 46 moves into engagement with valve element 48, to thereby cut off communication between inlet port 14 and drain or return port 16, and to simultaneously initiate communication between the inlet port 14 and annular chamber 56. Fluid communicated to inlet port 14 communicates into chamber 56, and thereafter communicates into chamber 78 through diverter passage 80. Fluid in chamber 78 communicates into chamber 84 through passage 90 and the check valve 92. As discussed hereinabove, although the pressures in chamber 78 and 84 will be substantially equal due to communication through the passage 90, the force acting on the piston 60 will be unequal due to the differential in the effective areas exposed to the fluid pressure level in chamber 78 and chamber 84.

Fluid communicates from chamber 84 to the brake chambers 20 through passage 86 and delivery port 18. As fluid continues to communicate into chamber 84, the pressure in chambers 84 and 78 gradually increases, since additional fluid is continually being communicated into the chamber 78. This increase in fluid pressure overcomes the mechanical or spring forces used to apply the parking brake chambers 20, thereby releasing the parking brakes and permitting the vehicle to be moved. When a predetermined pressure level is attained in the chambers 78 and 84, the force of spring 100 acting on piston 60 is overcome due to the aforementioned force differential. When this occurs, valve elements 102, 104 open to permit fluid to bypass the piston 60 through diverter bypass passage 106 into the drain passage 110. Accordingly, fluid pressure in chamber 84 is maintained at a predetermined level. Of course, should the pressure levels in chambers 78 or 84 be reduced, due to leakage, change in temperature, or for any other reason, a force differential is created on piston 60 causing the valve elements 102, 104 to reclose, thereby diverting additional fluid into chamber 84 to increase the pressure level therein. If the pressure level in the parking brake chambers 20 and chamber 84 increases above the working level due to, for example, changes in ambient temperature causing expansion of the hydraulic fluid, excessive pressure above a predetermined pressure level is vented through relief valve 88 into annular chamber 44, and from there through drain passage 110 and drain chamber 70 to the return or drain port 16.

When the vehicle is parked and the parking brakes are to be applied, the spool valve assembly 28 is moved to the position illustrated in the drawing, thereby cutting off communication into the chamber 78 and permitting delivery port 18 to be vented into annular chamber 44 and drain passage 110 into drain chamber 70, thereby permitting the aforementioned spring brake actuator to be applied.

We claim:

1. Control valve for controlling the parking brakes of a vehicle braking system having a source of fluid pressure, a reservoir, and mechanically applied parking brakes which are released by fluid pressure, said control valve comprising a housing having an inlet port communicated to a fluid pressure source, a return port communicated to said reservoir, and a delivery port communicated to said parking brakes, a diverter assembly within said housing responsive to fluid communication through said inlet port to establish a fluid pressure level communicated through said delivery port to said parking brakes for releasing the latter, a diverter passage communicating the inlet port with the diverter assembly, a system bypass passage communicating the inlet port with the return port bypassing said diverter assembly, and valve means in said housing movable from a first position closing said diverter passage and opening said bypass passage to a second condition closing said bypass passage and opening said diverter passage.

2. Control valve as claimed in claim 1, wherein said housing includes a drain passage communicating the delivery port with said return port, said valve means including means for closing said drain passage when the valve means is in the second condition and opening said drain passage to permit communication from the delivery port to the return port when the valve means is in the first position.

3. Control valve as claimed in claim 2, wherein said housing includes a diverter bypass passage communicating said diverter assembly with said drain passage when the pressure level at the delivery port attains a predetermined level, and check valve means in said drain passage preventing communication of fluid pressure from said diverter bypass passage to said valve means through said drain passage, but permitting communication through said drain passage from said valve means to said return port.

4. Control valve as claimed in claim 3, wherein said diverter assembly includes a piston slidably mounted in said housing, said piston assembly defining a pair of differential opposing effective areas, one of said effective areas being communicated to the pressure level in the inlet port when the valve means is in the second position, the other effective area being communicated to the pressure level in the delivery port, said piston carrying a valve member cooperating with a valve seat on the housing to control communication through the diverter bypass passage.

5. Control valve as claimed in claim 4, wherein said piston defines a passage therethrough communicating said one effective areas with said other effective area, and check valve means carried by the piston controlling communication through said passage to permit communication from the one effective area to the other effective area, but preventing communication in the reverse direction.

6. Control valve as claimed in claim 5, wherein a relief valve communicates the drain passage with the other effective area to permit excessive pressure to vent to said return port from the pressure level acting on said other effective area.

7. Control valve as claimed in claim 6, wherein a relief valve communicates the delivery port with the return port to permit excessive pressure to vent to said return port from the pressure level acting on said other effective area.

8. Control valve as claimed in claim 1, wherein said housing includes a delivery passage communicating the diverter assembly with said delivery port and a drain passage communicating the delivery port with said return port, said valve means including means for closing said drain passage when the valve means is in the second condition and opening said drain passage when the valve means is in the first position.

9. Control valve as claimed in claim 8, wherein said valve means projects from said housing and is engaged a mechanical actuator.

10. Control valve as claimed in claim 1, wherein said housing and said valve means carry a pair of cooperating sets of valve elements, one of said sets of valve elements controlling communication between the delivery port, the return port, and the diverter assembly, the other set of cooperating valve elements controlling communication between the inlet port, the return port, and the diverter assembly.

11. Control valve as claimed in claim 10, wherein said diverter assembly includes a piston slidably mounted in said housing, said piston assembly defining a pair of differential opposing effective areas, said other set of cooperating valve elements controlling communication between the inlet port, the return port and one of said differential opposing effective areas, the one set of cooperating valve elements controlling communication between the delivery port, the return port, and the other differential opposing effective area.

12. Control valve as claimed in claim 11, wherein said housing defines a bore therewithin, said cooperating sets of valve elements including valve seats spaced axially in said bore, said valve means being slidably mounted in said bore to engage and disengage with said valve seats.

13. Control valve as claimed in claim 12, wherein one of said valve seats is mounted on an annular member slidably mounted in said bore, said annular member being movable with the valve member when the valve member engages the valve seat mounted on the annular member.

14. Control valve as claimed in claim 12, wherein said valve means extends through one end of said bore and is engaged by a mechanical actuator.

15. Control valve as claimed in claim 12, wherein said valve means is a single elongated valve member carrying a pair of separate valve elements spaced apart on said valve member for engagement and disengagement with said valve seats.

16. Control valve as claimed in claim 15, wherein said valve member is a valve spool.

* * * * *